United States Patent [19]
Shimbo et al.

[11] Patent Number: 6,108,160
[45] Date of Patent: Aug. 22, 2000

[54] AUTOSTOP MECHANISM HAVING A ROTATABLE SPRING MEMBER

[75] Inventors: Takaichi Shimbo; Yoshio Anzai, both of Tokyo, Japan

[73] Assignee: MEC. Co., Ltd., Tokyo, Japan

[21] Appl. No.: 09/114,072

[22] Filed: Jul. 13, 1998

[51] Int. Cl.$^7$ ................................................. G11B 5/008
[52] U.S. Cl. .............................. 360/96.3; 360/137
[58] Field of Search ........................ 360/96.5, 96.6, 360/137, 96.1–96.4

[56] References Cited

U.S. PATENT DOCUMENTS

| | | |
|---|---|---|
| 4,809,101 | 2/1989 | Tanaka et al. . |
| 5,506,741 | 4/1996 | Kido ........................................ 360/137 |

FOREIGN PATENT DOCUMENTS

| | | |
|---|---|---|
| 656680 | 7/1988 | Japan . |
| 6-3142020 | 9/1988 | Japan . |

*Primary Examiner*—A. J. Heinz
*Attorney, Agent, or Firm*—Greenblum & Bernstein, P.L.C.

[57] ABSTRACT

In an autostop mechanism in a tape recorder equipped with an urging member, a sliding member and a shut-off cam gear, the urging member is located on a bottom surface of a chassis and is formed by a wire spring member. The wire spring member has a proximal end portion shaped like a polygon slightly smaller than a diameter of a shaft of a take-up reel so as to provide urging force when fitted over the shaft of the take-up reel, a distal end extending toward the sliding member, and a midway portion bent at a predetermined angle to form a bent portion abutting against the sliding member in such a way that the urging force of the wire spring member and an action of the distal end of the wire spring member press the sliding member toward a center of the shut-off cam gear cam gear by regardless of the rotational direction of the take-up reel.

2 Claims, 8 Drawing Sheets

AUTOSTOP MECHANISM HAVING A ROTATABLE SPRING MEMBER

BACKGROUND OF THE INVENTION

1. Field of the Invention

The present invention relates to an autostop mechanism in a tape recorder.

2. Description of the Related Art

In an ordinary cassette tape recorder, a sensor member which serves as an urging member to urge a shut-off cam is provided on the top side of a chassis and a cassette tape is rotatably installed directly above the sensor member.

The sensor member to be the urging member, whether it is made of plastic or by a spring, is designed in a ring shape to produce the urging force. A change in precision or temperature may cause the urging force of the sensor member to vary or may produce friction which interferes with the smooth movement of the sensor member. This makes it difficult to produce excellent sensor members.

SUMMARY OF THE INVENTION

Accordingly, it is an object of the present invention to provide an autostop mechanism in a tape recorder, equipped with a wire spring member, which serves as an urging member for urging a shut-off lever toward a shut-off cam, has a polygon-shaped proximal end portion to be fitted over a reel shaft to thereby generate stable urging force, and is provided on the bottom of a chassis, not on the usual top surface thereof where a tape cassette is placed. This frees some space on the top side of the chassis, thus contributing to designing the tape recorder more compact.

To achieve the above object, in an autostop mechanism in a tape recorder equipped with an urging member, a sliding member and a shut-off cam gear according to this invention, the urging member is located on a bottom surface of a chassis and is formed by a wire spring member, which has a proximal end portion shaped like a polygon slightly smaller than a diameter of a shaft of a take-up reel so as to provide urging force when fitted over the shaft of the take-up reel, a distal end extending toward the sliding member, and a midway portion bent at a predetermined angle to form a bent portion abutting against the sliding member in such a way that the urging force of the wire spring member and an action of the distal end of the wire spring member press the sliding member toward a center of the shut-off cam gear cam gear by regardless of the rotational direction of the take-up reel.

The autostop mechanism with the above structure operates as follows.

In the transition from a stop state to a playback state, as a head base is pushed, a lock plate rotates to be locked. When a motor rotates, a motor pulley rotates, causing a flywheel to rotate. This causes a flywheel gear to rotate. As a result, a center gear rotates, causing the gear of the take-up reel to rotate.

Then, the wire spring member fitted over the shaft of the take-up reel turns, so that its distal end abuts on a shut-off arm, pressing the arm in the rotational direction. As the proximal end of the wire spring member has a polygonal shape whose inside diameter is slightly smaller than the diameter of the take-up reel shaft, the inside-diameter portion generates stable urging force. This stable urging force causes the shut-off arm to slide.

When the tape comes to the end, a take-up reel gear stops rotating and the wire spring member coaxial to this gear also stops rotating. Consequently, the urging force which has been pushing the shut-off arm is gone, the shut-off arm stops sliding. Then, the distal end of the shut-off arm rides over the crescent portion of the shut-off cam gear to be turned further. The other end portion of the shut-off arm pushes and turns the lock plate, unlocking the lock plate from the head base. Then, autostop takes place.

DETAILED DESCRIPTION OF THE PREFERRED EMBODIMENT

Figure 1:
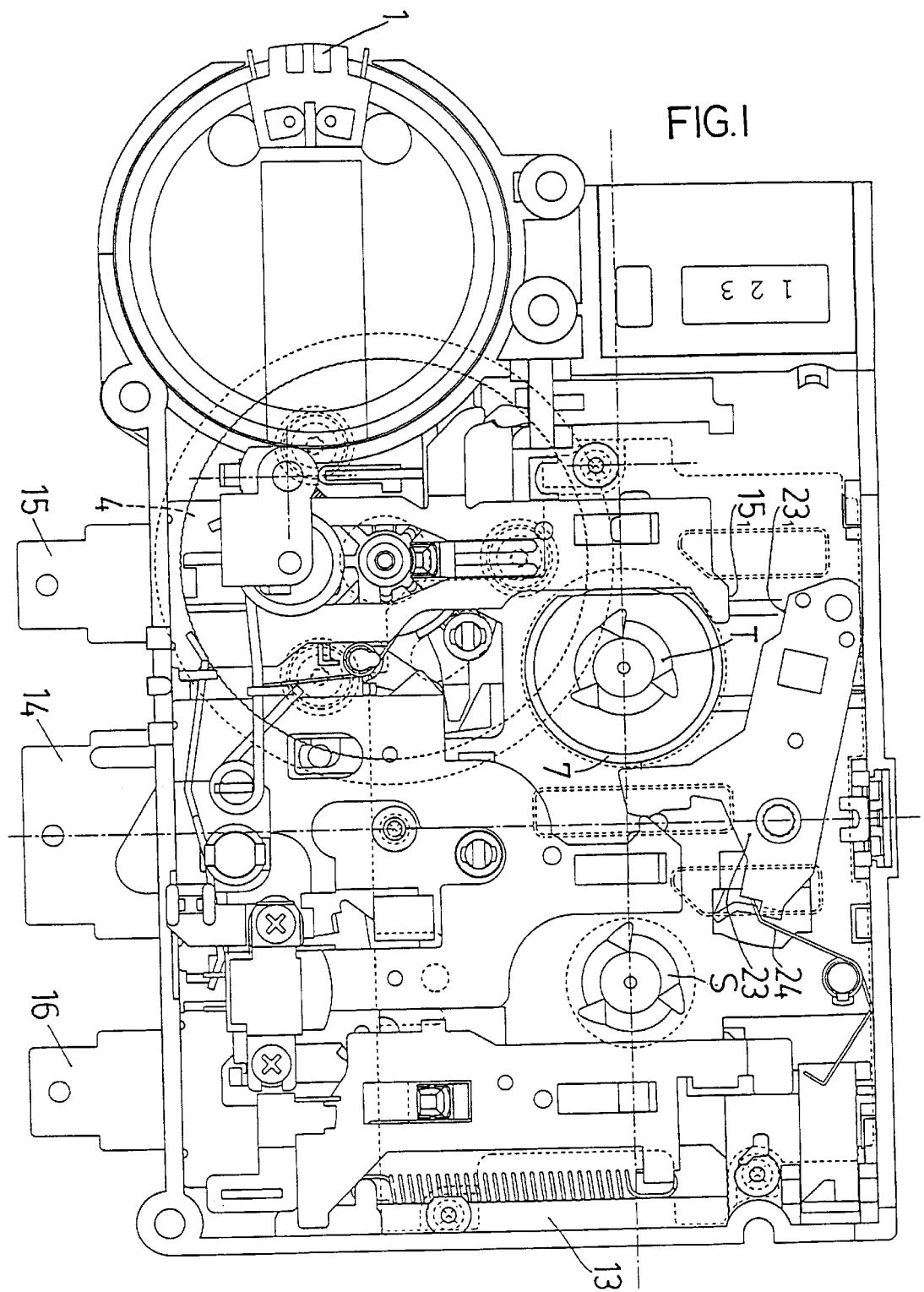
FIG. 1 is a plan view showing a stop state of a cassette tape recorder according to this invention.

A preferred embodiment of the present invention will now be described with reference to the accompanying drawings. In the figures, "1" is a motor for driving a flywheel 4, "2" is a motor pulley, "3" is a belt put around the motor pulley 2 and the flywheel 4, "5" is a gear coaxial to the flywheel 4, "6" is a center gear which engages with the flywheel gear 5, and "7" is a gear of a take-up reel T, which engages with the center gear 6. A wire spring member 8, which serves as an urging member, has a proximal end attached to a shaft 70 of the take-up reel gear 7. A shut-off arm 9 has a downward projection 9' at its distal end and an engage portion 9" at its proximal end portion. The engage portion 9" engages with a lock plate 23.

Figure 2:
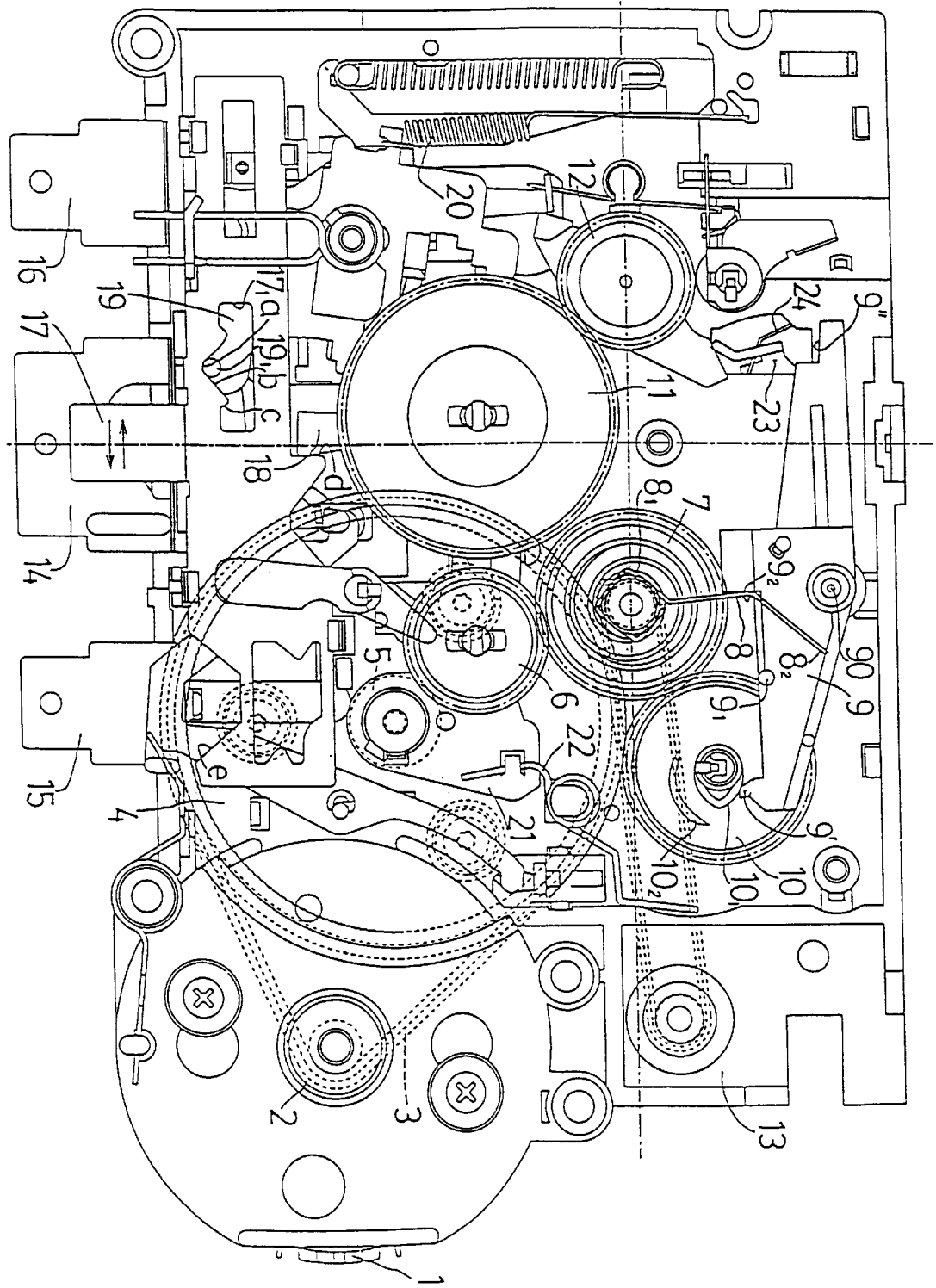
FIG. 2 is a bottom view of the stop state in FIG. 1.
Figure 3:
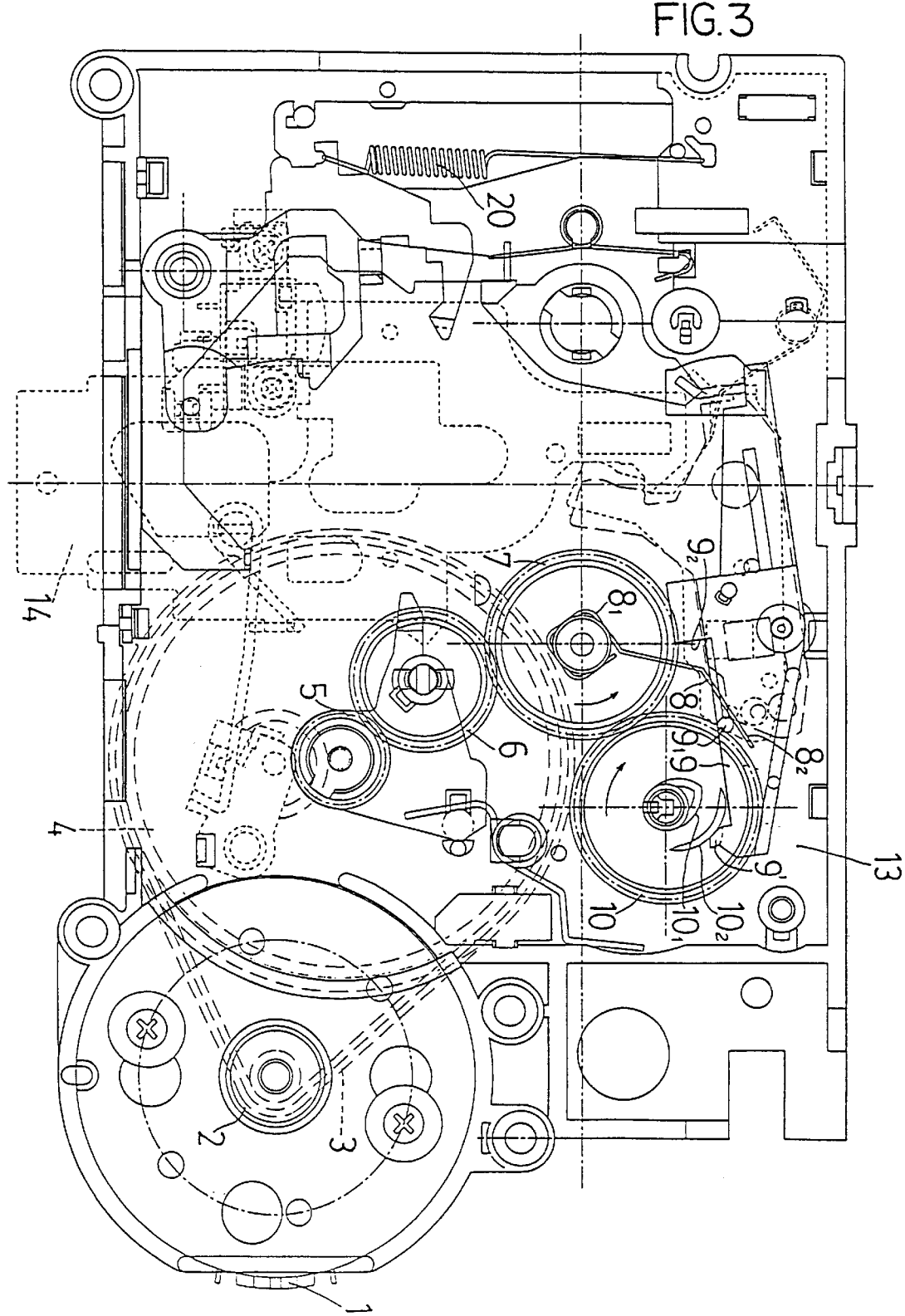
FIG. 3 is a bottom view of the tape recorder in an autostop operation.

A shut-off cam gear 10 has a heart-shaped shut-off cam $10_1$ and a crescent cam $10_2$. The distal end 9' of the shut-off arm 9 comes in contact with or away from the shut-off cam $10_1$ and the crescent cam $10_2$. A gear 12 of a rewind reel S engages with a rewind gear 11. "13" is a chassis, "14" is a head base, "15" is a stop lever, "16" is a recording lever, "17" is a fast forward and rewind (FR) lever, "18" is a rewind arm, "19" is a switch lever, "20" arm spring, and "21" is a center arm which is attached coaxial to the flywheel gear 5. A center arm spring 22, which engages with the center arm 21, is urged rightward (FIG. 2) in a stop state. "24" is a lock plate spring.

Specific Operations

Individual operations based on the aforementioned components will now be discussed specifically.

Operation Procedures From Stop to Playback
Operational System

When the head base 14 is pushed, the lock plate 23 rotates to be locked.
Rotational System As the motor 1 rotates, the motor pulley 2 rotates. Then, the flywheel 4 rotates via the belt 3. This causes the flywheel gear 5 to rotate. As a result, the center gear 6 rotates, causing the take-up reel T to rotate.

Operation Procedures From Playback to Stop

When the stop lever 15 is pushed in a playback state, the distal end of the stop lever 15 presses a lower end portion $23_1$ of the lock plate 23, turning the lock plate 23. As a result, the lock plate 23 is unlocked from the head base 14.

Figure 4:
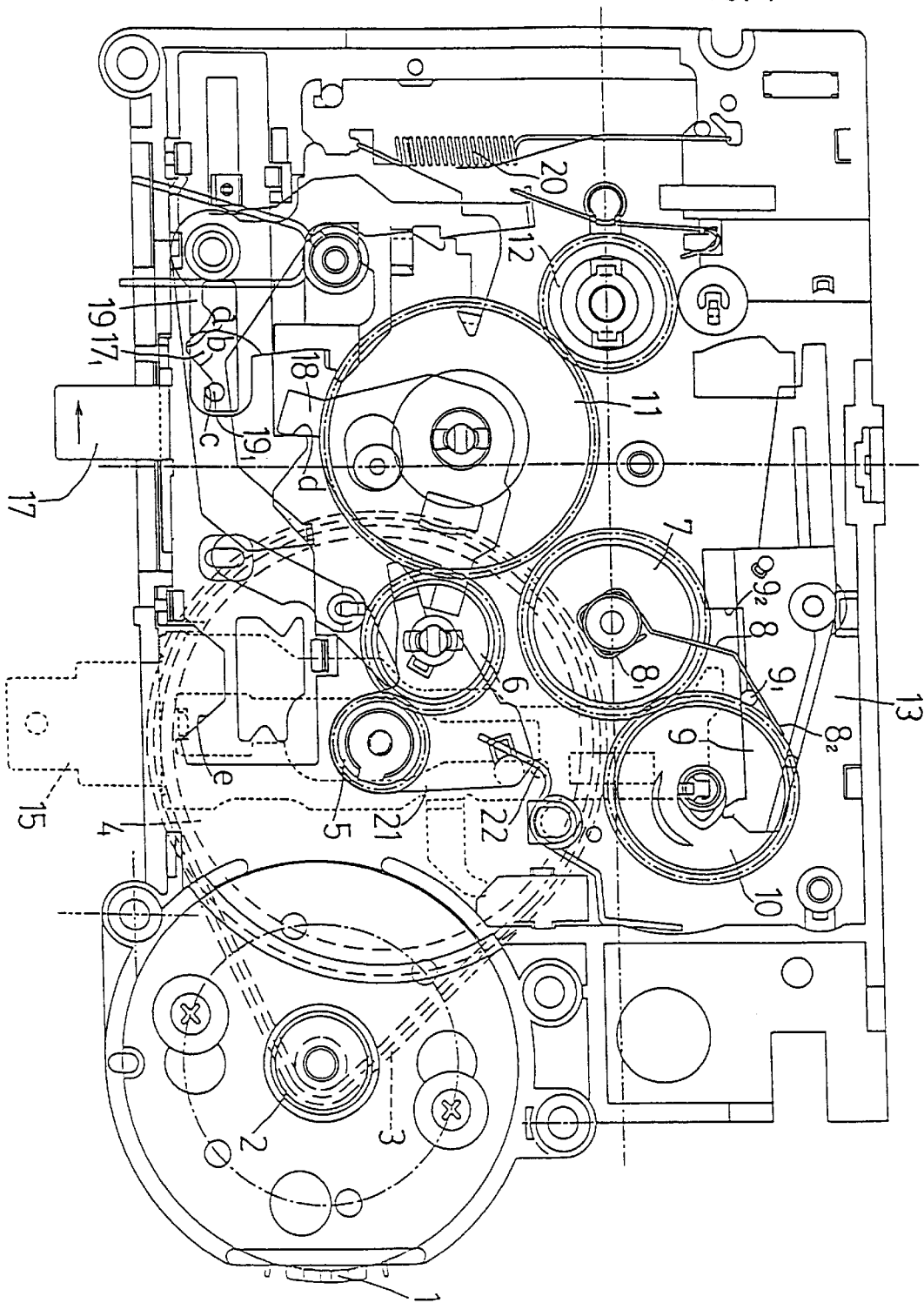
FIG. 4 is a bottom view of a rewinding state.

Operation Procedures From Stop to Rewinding (FIG. 4)

The FR lever 17 is manipulated leftward from the stop state. Then, the projection $19_1$ of the stop lever 19 slides through an oblique position b from a recess position a of a deformed hole $17_1$ of the FR lever 17, and enters the lock portion to be locked. When the FR lever 17 is manipulated leftward at a vertical pressing position d, the rewind arm 18 is turned, the other end of the rewind arm 18 simultaneously turning the center arm 21, causing the center gear 6 to engage with the rewind gear 11. At this time, rotation is transmitted from the motor 1, to the motor pulley 2, to the belt 3, to the flywheel 4, the flywheel gear 5, to the center gear 6, to the rewind gear 11 and then to the rewind reel gear 12, so that rewinding is effected.

When rewinding is effected, the tape rotates and the gear 7 of the take-up reel T rotates clockwise. The wire spring member 8, fitted over the gear shaft 70 of the take-up reel T, rotates in the same direction, and its middle portion formed at a predetermined angle θ (45 degrees in the illustrated example) at the bent portion of the wire spring member 8 pushes the projection $9_1$ of the shut-off arm 9. consequently, the distal end 9' of the shut-off arm 9 slides while being pressed toward the center of the shut-off cam gear 10.

Operation Procedures From Rewinding to Stop

When the stop lever 15 is pushed in the rewinding state, the bent portion of the stop lever 15 pushes the FR lever 17 at an inclined position e, pushing the switch lever projection $19_1$ upward to effect unlocking. As a result, the tapes stops.

Figure 5:
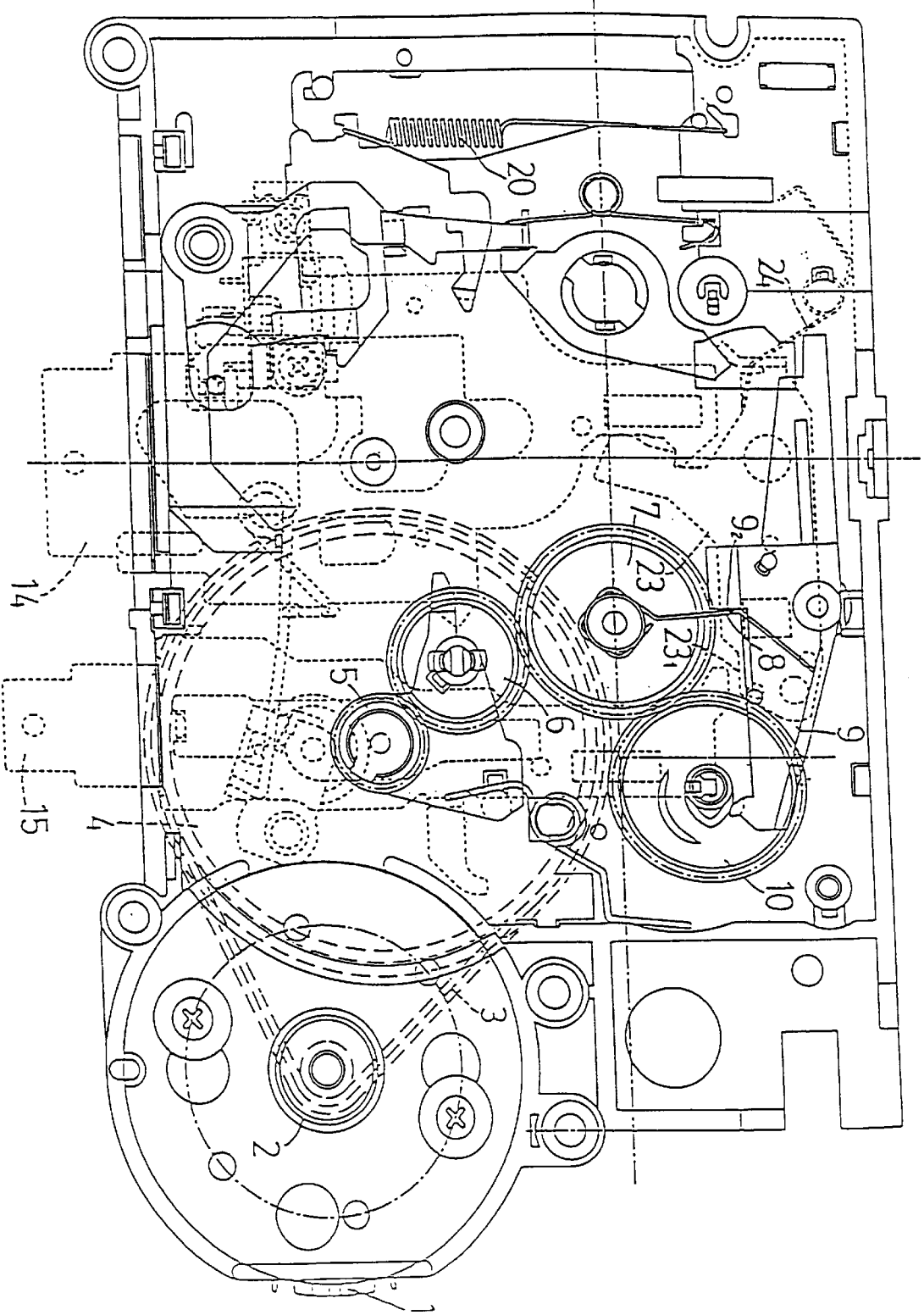
FIG. 5 is a bottom view of a playback-locked state.

Playback Mode (FIG. 5)

The gear 7 of the take-up reel T rotates counterclockwise, and the gear shaft 70 of the take-up reel T also rotates in the same direction. Then, the wire spring member 8 turns in the same direction, pushing a vertical reception portion $9_2$ of the shut-off arm 9. Then, the downward projection 9' at the distal end of the shut-off arm 9 slides while being pressed toward the center of the shut-off cam gear 10.

Figure 6:
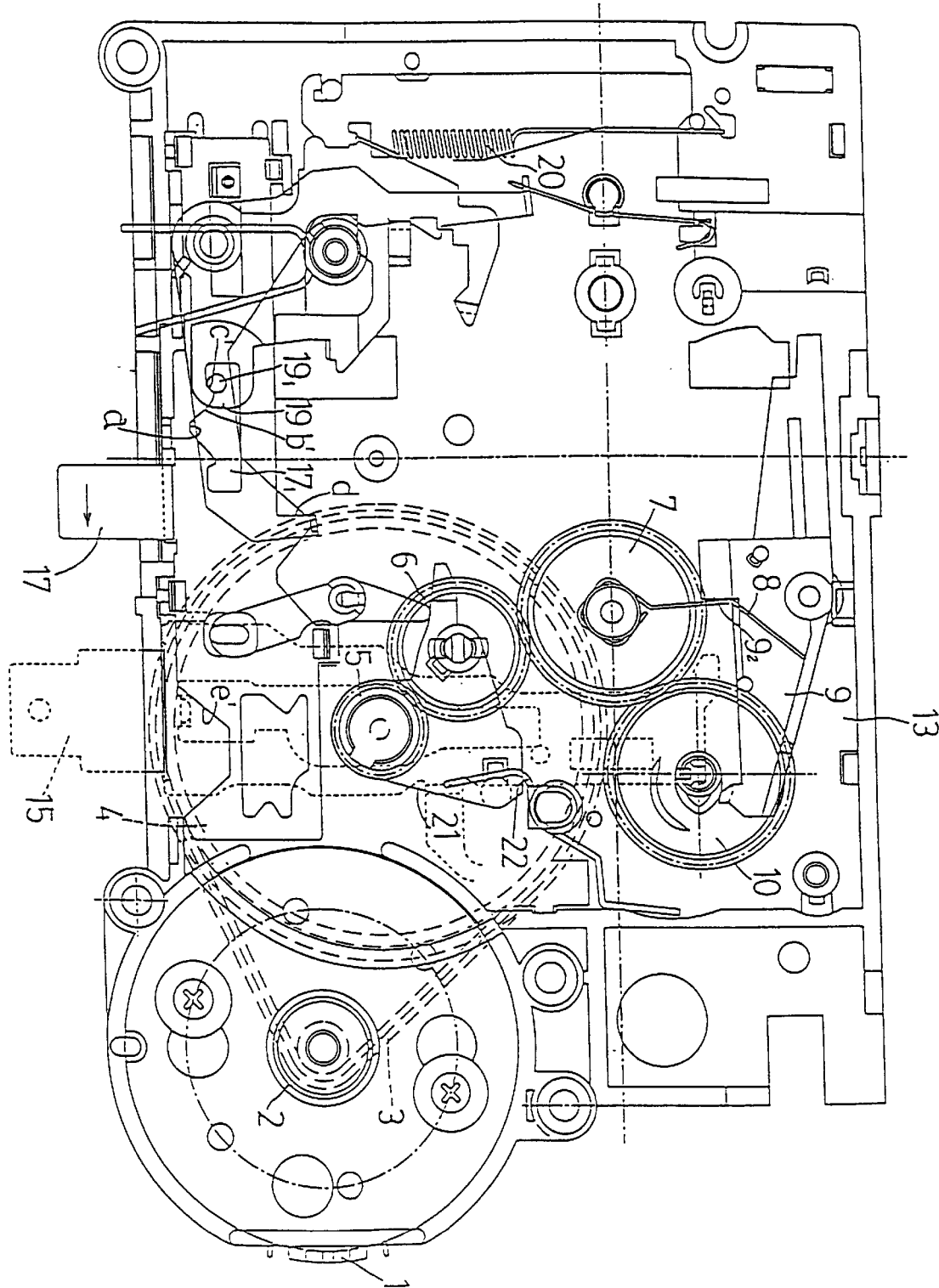
FIG. 6 is a bottom view of a fast forwarding state.
Figure 7:
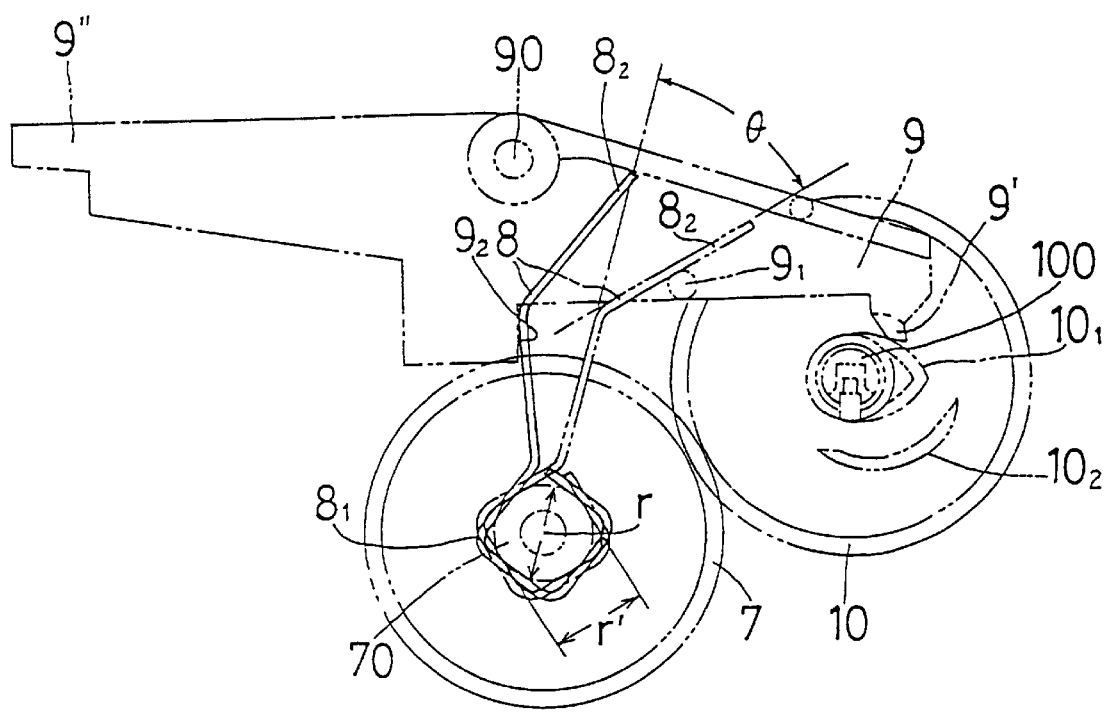
FIG. 7 is an enlarged view of a wire spring member shown in FIG. 2.
Figure 8:
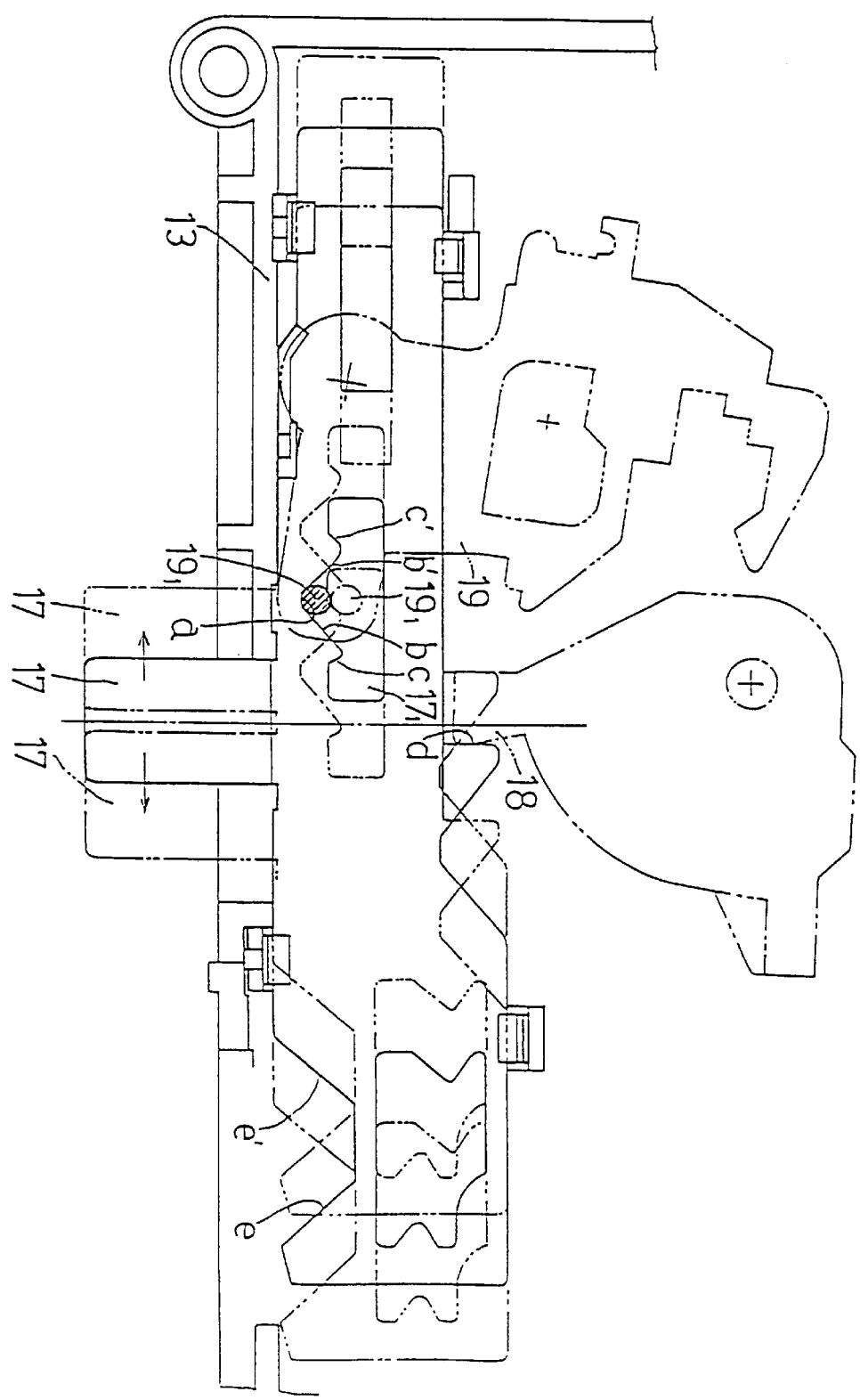
FIG. 8 is an enlarged view of a fast forward and rewind (FR) lever shown in FIG. 2.

Operation Procedures From Stop to Fast Forward (FIG. 6)

The FR lever 17 is manipulated rightward from the stop state. Then, the projection $19_1$ of the stop lever 19 slides through an oblique position b' from the recess position a of the deformed hole $17_1$ of the ER lever 17, and enters the lock portion c' to be locked. Under this situation, rotation is transmitted from the motor 1, to the motor pulley 2, to the belt 3, to the flywheel 4, the flywheel gear 5, to the center gear 6, to the take-up reel gear 7, setting the fast forward state. As the reel gear 7 rotates, the wire spring member 8, fitted over the reel gear shaft 70, rotates in the same direction, pushing the shut-off arm 9. As a result, the downward projection $9_1$ at the distal end of the shut-off arm 9 slides while being always pressed toward the center of the shut-off cam gear 10.

Operation Procedures From Fast Forward to Stop

When the stop lever 15 is pushed in the fast forward state, the bent portion of the stop lever 15 pushes the FR lever 17 at an inclined position e', pushing the switch lever projection $19_1$ upward to effect unlocking. As a result, the tapes stops.

Autostop Mode

When the tape being played back comes to the end, the gear shaft 70 of the take-up reel T stops rotating. Then, the wire spring member 8 stops rotating. Consequently, the shut-off cam $10_1$ of the shut-off cam gear 10 pushes the distal end 9' of the shut-off arm 9 so that the distal end 9' turns outward and then stops. The distal end 9' then rides over the crescent cam $10_2$ of the shut-off cam gear 10 that comes rotating, and is turned further outward. The other end portion 9" of the shut-off arm 9 pushes and turns the lock plate 23, unlocking the lock plate 23 from the head base 4. This allows autostop to take place.

According to the above-described structure of the invention, the urging member formed by the wire spring member having a polygon-shaped portion, slightly smaller in diameter than the take-up reel shaft, fitted over the take-up reel shaft, can provide stable urging force.

As the wire spring member, which serves as the urging member to apply urging force to the shut-off arm, is provided on the bottom of the chassis, not on the usual top surface thereof where a tape cassette is placed. This can free some space on the top side of the chassis, thus allowing the tape recorder to be designed more compact.

What is claimed is:

1. An autostop mechanism for a tape player, the tape player including:
    a take-up reel;
    a rewind reel;
    a motor adapted to rotate the take-up reel in at least one of a first predetermined direction comprising a take-up mode and play mode, and a second predetermined direction, opposite the first predetermined direction comprising a rewind mode;
    a head base having a head; and
    a lock adapted to hold the head base in a locked position in at least one of the take-up mode, play mode and rewind mode;
    the autostop mechanism comprising:
        a gear having a rotation shaft and adapted to engagingly rotate about said rotation shaft with the take-up reel, said gear having a cam eccentrically positioned with respect to said rotation shaft;
        a spring member having a proximal end elastically connected to the take-up reel and being biased to rotate in a same direction as the direction of rotation of the take-up reel; and
        a rotatable arm having a first end and a second end, said rotatable arm comprising:
            a first engagement member located at said first end and adapted to engage the lock;
            a second engagement member located at said second end and adapted to engage said cam;
            a third engagement member adapted to engage said spring member when said spring member rotates with the take-up reel in the first predetermined direction; and
            a fourth engagement member adapted to engage said spring member when said spring member rotates with the take-up reel in the second predetermined direction;
        wherein, when said spring member is engaged with one of said third and fourth engagement members, said rotatable arm is biased to rotate in the same direction as said spring member, and said first engagement member does not engage said lock; and wherein, when said take-up reel stops, said second engagement member engages said cam and rotates said rotatable arm in a direction opposite said same direction, and said first engagement member engages said lock and releases the head base from the locked position.

2. The autostop mechanism according to claim 1, wherein said proximal end of said spring member is polygonally-shaped and has a plurality of sides press-fit about a rotatable shaft of the take-up reel.

* * * * *

UNITED STATES PATENT AND TRADEMARK OFFICE
CERTIFICATE OF CORRECTION

PATENT NO. : 6,108,160
DATED : August 22, 2000
INVENTOR(S) : T. SHIMBO et al.

It is certified that error appears in the above-identified patent and that said Letters Patent is hereby corrected as shown below:

On the cover of the printed patent, at Item [73], Assignee, after "MEC" delete " . ".

On the cover of the printed patent, at Item [57], Abstract, line 15, delete "cam gear by".

Signed and Sealed this

Twenty-ninth Day of May, 2001

*Attest:*

NICHOLAS P. GODICI

*Attesting Officer*    *Acting Director of the United States Patent and Trademark Office*